(12) United States Patent
Nakano et al.

(10) Patent No.: US 10,071,396 B2
(45) Date of Patent: Sep. 11, 2018

(54) LAMINATED COATING FILM AND COATED ARTICLE

(71) Applicant: MAZDA MOTOR CORPORATION, Hiroshima (JP)

(72) Inventors: Sakura Nakano, Hiroshima (JP); Hiroshi Kubota, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 13 days.

(21) Appl. No.: 14/421,417

(22) PCT Filed: Mar. 11, 2013

(86) PCT No.: PCT/JP2013/001565
§ 371 (c)(1),
(2) Date: Feb. 12, 2015

(87) PCT Pub. No.: WO2014/033974
PCT Pub. Date: Mar. 6, 2014

(65) Prior Publication Data
US 2015/0202655 A1 Jul. 23, 2015

(30) Foreign Application Priority Data
Aug. 28, 2012 (JP) ................. 2012-187715

(51) Int. Cl.
*B05D 5/06* (2006.01)
*G01J 3/52* (2006.01)
(Continued)

(52) U.S. Cl.
CPC ............ *B05D 5/068* (2013.01); *B05D 5/06* (2013.01); *B05D 7/572* (2013.01); *G01J 3/522* (2013.01);
(Continued)

(58) Field of Classification Search
None
See application file for complete search history.

(56) References Cited

U.S. PATENT DOCUMENTS 4,882,228 A * 11/1989 Nakahama ............... C08K 5/13
427/407.1
5,647,535 A 7/1997 Nakazono et al.
(Continued)

FOREIGN PATENT DOCUMENTS

CN 1939604 A 4/2007
JP S61-018469 A 1/1986
(Continued)

OTHER PUBLICATIONS

English translation of Kawabata et al. JP 2011131135, Jul. 2011.*
International Search Report; PCT/JP2013/001565; dated Oct. 15, 2013.

*Primary Examiner* — Ronak C Patel
(74) *Attorney, Agent, or Firm* — Studebaker & Brackett PC

(57) ABSTRACT

A laminated coating film (2) includes a metallic base layer (4) and a color clear layer 5, and produces a target color with the metallic base layer 4 and the color clear layer (5). The laminated coating film (2) is designed to have high chroma at the highlight, and further to provide an appearance of denseness. To address this, the laminated coating film satisfies the following formula (1):

$$(R^{H(P)}/R^{H(OA)})>60 \qquad (1)$$

where $R^{H(P)}$ represents a highlight reflectance of light of the target color, and $R^{H(OA)}$ represents an average highlight reflectance of light in a wavelength range outside a hue range of the target color.

9 Claims, 12 Drawing Sheets

(51) Int. Cl.
*G02B 5/26* (2006.01)
*B05D 7/00* (2006.01)

(52) U.S. Cl.
CPC ............ *G02B 5/26* (2013.01); *B05D 2202/10* (2013.01); *Y10T 428/31678* (2015.04)

(56) References Cited

U.S. PATENT DOCUMENTS

| | | | |
|---|---|---|---|
| 5,702,519 A * | 12/1997 | Nitta | A61K 8/26 |
| | | | 106/442 |
| 6,362,885 B1 | 3/2002 | Osumi et al. | |
| 2004/0159555 A1 | 8/2004 | Purdy et al. | |
| 2005/0100674 A1 | 5/2005 | Brown et al. | |
| 2005/0208292 A1 | 9/2005 | Kuramochi et al. | |
| 2007/0077437 A1 | 4/2007 | Kakii et al. | |
| 2009/0317629 A1* | 12/2009 | Wegner | C09D 4/00 |
| | | | 428/336 |

FOREIGN PATENT DOCUMENTS

| | | |
|---|---|---|
| JP | H03-26110 B2 | 4/1991 |
| JP | H08-117679 A | 5/1996 |
| JP | H10-246671 A | 9/1998 |
| JP | H10-310727 A | 11/1998 |
| JP | H11-80587 A | 3/1999 |
| JP | 2001-164191 A | 6/2001 |
| JP | 2002-086057 A | 3/2002 |
| JP | 2002-121493 A | 4/2002 |
| JP | 2003-073620 A | 3/2003 |
| JP | 2005-169385 A | 6/2005 |
| JP | 2006-281451 A | 10/2006 |
| JP | 2012-011302 A | 1/2012 |

* cited by examiner

LAMINATED COATING FILM AND COATED ARTICLE

TECHNICAL FIELD

The present invention relates to a laminated coating film including a metallic base layer and a color clear layer on the metallic base layer, and a coated article including the laminated coating film.

BACKGROUND ART

In recent years, articles to be coated that are required to provide an aesthetic design, such as automobiles, have been required to be coated with a coating color having high chroma at the highlight and great depth. In an automobile, a two-coat, one-bake (2C/1B) process or a three-coat, one-bake (3C/1B) process is employed to coat a vehicle body, and a metallic base layer and a color clear layer are used as a first base coating layer (1BC) and a second base coating layer (2BC), respectively, to achieve the design. Unfortunately, variations in the orientations of aluminum flakes serving as a bright material of the 1BC and an uneven coating of the 2BC (thickness variations of the 2BC) tend to cause variations in chroma and lightness and a frame phenomenon (a phenomenon in which a peripheral portion of a coated article is thicker than a common area of the coated article to cause variations in color between the common area and the end portion). For this reason, mass-produced vehicles must actually be coated with a color which has low lightness and allows such variations and the frame phenomenon to be less conspicuous.

In contrast to this, Patent Document 1 describes a molding multilayer sheet that is useful for, for example, automobile-related members and provides a design providing an appearance of depth. The multilayer sheet includes a metallic luster layer, and a colored layer placed on the metallic luster layer. Light transmitted through the colored layer of the multilayer sheet has a lightness L* of 20-80, the metallic luster layer of the multilayer sheet has a gloss value of 200 or greater, and light specularly reflected off the multilayer sheet at 45 degrees has a chroma C* of 150 or greater. Unfortunately, the range of uses of the molding multilayer sheet is limited.

CITATION LIST

Patent Document

PATENT DOCUMENT 1: Japanese Unexamined Patent Publication No. 2006-281451

SUMMARY OF THE INVENTION

Technical Problem

It is a first object of the present invention to allow a laminated coating film including a metallic base layer and a color clear layer on the metallic base layer to have high chroma at the highlight and to provide an appearance of denseness.

It is a second object of the present invention to allow the laminated coating film to have high chroma at the highlight and to provide an appearance of denseness and an appearance of depth.

It is a third object of the present invention to allow the laminated coating film to have high chroma at the highlight, to be superior in appearance of denseness, and to provide an appearance of great depth.

Solution to the Problem

The inventors of this application focused on the relationship between the highlight reflectance of light of a target color produced by a metallic base layer of a laminated coating film and a color clear layer thereof placed on the metallic base layer and the average highlight reflectance of light in a wavelength range outside a hue range of the target color, and enabled the laminated coating film to have high chroma at the highlight and to provide an appearance of denseness.

It has been said that a dark coating color with high chroma provides an appearance of depth, and it has been also said that when a coating color has high lightness at the highlight, and the difference in chroma between the highlight and the shade is great, the coating color provides an appearance of depth. The inventors of this application focused on the highlight reflectance and the shade reflectance, and further focused on the face reflectance to achieve an appearance of great depth.

Specifically, a laminated coating film presented here includes: a metallic base layer; and a color clear layer. The metallic base layer and the color clear layer allow the laminated coating film to produce a target color. Here, a reflectance measured with reference to a reflectance of a standard white plate at a light incidence angle of 45 degrees and a light reception angle of +30 degrees is defined as a highlight reflectance. In the specification, the "reflectance" denotes a spectral reflectance factor (see "Measurement (1) Method for a Spectral Reflectance Factor" specified in paragraph 4.3.3 of Japanese Industrial Standards (JIS) Z 8722).

When a hue range is indicated by dividing a Munsell hue circle into one hundred sectors with a hue of the target color set at a median value of the Munsell hue circle, and increasing a hue number to +50 in a counterclockwise direction while decreasing the hue number to −50 in a clockwise direction, a range from −25 to +25 corresponds to a hue range of the target color, and the laminated coating film satisfies the following formula (1):

$$(R^{H(P)}/R^{H(OA)}) > 60 \qquad (1)$$

where $R^{H(P)}$ represents a highlight reflectance of light of the target color, and $R^{H(OA)}$ represents an average highlight reflectance of light in a wavelength range outside the hue range.

This shows that the highlight reflectance $R^{H(P)}$ of the target color is higher than the average highlight reflectance $R^{H(OA)}$ of light in the wavelength range outside the hue range of the target color, and specifically exceeds 60 times the average highlight reflectance $R^{H(OA)}$. Thus, high chroma at the highlight is achieved, and the appearance of denseness is enhanced.

In a preferred embodiment of the present invention, a reflectance measured with reference to a reflectance of the standard white plate at the light incidence angle of 45 degrees and a light reception angle of −30 degrees is defined as a shade reflectance, and the laminated coating film satisfies the following formula (2):

$$(R^{H(P)}/R^{H(OA)}) \times (R^{H(P)} - R^{S(P)}) \times 1/100 > 30 \qquad (2)$$

where $R^{S(P)}$ represents a shade reflectance of light of the target color.

This shows that the highlight reflectance $R^{H(P)}$ of the target color exceeds 60 times the average highlight reflectance $R^{H(OA)}$ of light in the wavelength range outside the hue range of the target color, and the difference ($R^{H(P)}-R^{S(P)}$) between the highlight reflectance $R^{H(P)}$ and shade reflectance $R^{S(P)}$ of the target color is great. The situation where the highlight-to-shade reflectance difference ($R^{H(P)}-R^{S(P)}$) is great means that the lightness and chroma significantly vary with a change in the observation angle at which the surface of the coating film is observed. This provides an appearance of depth. Thus, high chroma, an appearance of denseness, and an appearance of depth can be achieved at the same time.

In a preferred embodiment of the present invention, a reflectance measured with reference to a reflectance of the standard white plate at the light incidence angle of 45 degrees and a light reception angle of 0 degree is defined as a face reflectance, and the laminated coating film satisfies the following formula (3):

$$(R^{H(P)}/R^{H(OA)}) \times (R^{H(P)}-R^{S(P)}) \times (1/R^{F(P)}) \times (1/100) > 2 \quad (3)$$

where $R^{F(P)}$ represents a phase reflectance of light of the target color

This shows that the highlight reflectance $R^{H(P)}$ of light of the target color exceeds 60 times the average highlight reflectance $R^{H(OA)}$ of light in the wavelength range outside the hue range of the target color, the highlight-to-shade reflectance difference ($R^{H(P)}-R^{S(P)}$) is great, and the face reflectance $R^{F(P)}$ of light of the target color is low. The situation where the face reflectance $R^{F(P)}$ is low means that the degree of change in color tone with a change in the observation angle is high. In other words, the color tone sharply changes with the change in observation angle. This provides an appearance of great depth. This situation further helps achieve high chroma, an appearance of depth, and an appearance of denseness at the same time.

The laminated coating film more preferably satisfies the following formula (4). This provides an appearance of greater depth, and helps achieve high chroma, an appearance of depth, and an appearance of denseness.

$$(R^{H(P)}/R^{H(OA)}) \times (R^{H(P)}-R^{S(P)}) \times (1/R^{F(P)}) \times (1/100) > 8 \quad (4)$$

In a preferred embodiment of the present invention, a transmittance $T_{2BC}^{(P)}$ of light of the target color through the color clear layer is higher than or equal to 55%, and an average transmittance $T_{2BC}^{(OA)}$ of light in the wavelength range outside the hue range is equal to or lower than 50%. In this specification, the "transmittance" denotes the light transmittance measured using an integrating sphere (see a measurement method specified in JIS R 3106 "Testing Method on Transmittance, Reflectance and Solar Heat Gain Coefficient of Flat Glasses").

The situation where the transmittance $T_{2BC}^{(P)}$ of light of the target color through the color clear layer is high (higher than or equal to 55%), and the average transmittance $T_{2BC}^{(OA)}$ of light in the wavelength range outside the hue range is low (equal to or lower than 50%) means that a large amount of light of the target color is passed through the color clear layer, and a large amount of light of colors except the target color is absorbed by the color clear layer. Thus, light of the target color is principally reflected off the metallic base layer, thereby helping achieve high chroma (color sharpness).

In a preferred embodiment of the present invention, a difference ($R_{1BC}^{H(P)}-R_{1BC}^{S(P)}$) between a highlight reflectance $R_{1BC}^{H(P)}$ of light of the target color off the metallic base layer and a shade reflectance $R_{1BC}^{S(P)}$ of light of the target color off the metallic base layer is greater than or equal to 90%, and a face reflectance $R_{1BC}^{F(P)}$ of the target color off the metallic base layer is equal to or lower than 30%. The laminated coating film satisfies the following formula (5):

$$R_{1BC}^{H(O-MAX)} \times (T_{2BC}^{(O-MAX)}/100)^2 < 7 \quad (5)$$

where $R_{1BC}^{H(O-MAX)}$ represents a maximum highlight reflectance of the metallic base layer in the wavelength range outside the hue range, and $T_{2BC}^{(O-MAX)}$ represents a light transmittance of the color clear layer at a wavelength of light having the maximum highlight reflectance.

The situation where the difference ($R_{1BC}^{H(P)}-R_{1BC}^{S(P)}$) between the highlight reflectance of light of the target color off the metallic base layer and the shade reflectance of light of the target color off the metallic base layer is great (greater than or equal to 90%) means that the intensity of light reflected off the metallic base layer significantly varies depending on the observation angle. This helps provide an appearance of great depth.

The situation where the face reflectance $R_{1BC}^{F(P)}$ of the metallic base layer is low (equal to or lower than 30%) means that the degree of change in the reflected light intensity with a change in observation angle is high. In other words, the reflected light intensity sharply changes with the change in observation angle. This situation further helps provide an appearance of great depth.

The formula (5) "$R_{1BC}^{H(OA)} \times (T_{2BC}^{(OA)}/100)^2 < 7$" means that a small amount of light of colors except the target color is reflected off the metallic base layer, or a large amount of light of colors except the target color is absorbed by the color clear layer. In short, the amount of light of colors except the target color exiting from the laminated coating film is small. This helps achieve high chroma.

Here, the reflectance difference ($R_{1BC}^{H(P)}-R_{1BC}^{S(P)}$) of the metallic base layer is preferably greater than or equal to 150%, and more preferably greater than or equal to 170%. The face reflectance $R_{1BC}^{F(P)}$ of the metallic base layer is preferably equal to or lower than 25%.

The laminated coating film may be formed by a 2C/1B process to include the color clear layer as the surface of the coating film, or may be formed by a 3C/1B process to include a transparent top clear layer on the color clear layer. Examples of a coated article obtained by forming the laminated coating film on an article to be coated include a vehicle body of an automobile. The coated article may be a motorcycle, any other vehicle, or any other metal product.

Advantages of the Invention

According to the present invention, a laminated coating film includes: a metallic base layer; and a color clear layer. The metallic base layer and the color clear layer allow the laminated coating film to produce a target color. The laminated coating film satisfies the formula (1) "($R^{H(P)}/R^{H(OA)}$) >60," where $R^{H(P)}$ represents a highlight reflectance of light of the target color, and $R^{H(OA)}$ represents an average highlight reflectance of light in a wavelength range outside the hue range. This helps achieve high chroma at the highlight and an appearance of denseness and enhance the appearance of the coated article.

The laminated coating film satisfies the formula (2) "($R^{H(P)}/R^{H(OA)}$)×($R^{H(P)}-R^{S(P)}$)×1/100>30," where $R^{S(P)}$ represents a shade reflectance of light of the target color. Thus, high chroma at the highlight, an appearance of denseness, and an appearance of depth can be achieved at the same time. Furthermore, the laminated coating film satisfies the formula (3) "($R^{H(P)}/R^{H(OA)}$)×$R^{H(P)}-R^{S(P)}$)×(1/$R^{F(P)}$)×(1/

100)≥2," where $R^{F(P)}$ represents a phase reflectance of light of the target color. This further helps achieve high chroma at the highlight, an appearance of depth, and an appearance of denseness.

DESCRIPTION OF EMBODIMENTS

Embodiments of the present invention will be described with reference to the drawings. The following preferred embodiments are set forth merely for the purposes of examples in nature, and are not intended to limit the scope, applications, and use of the invention.

Figure 1:
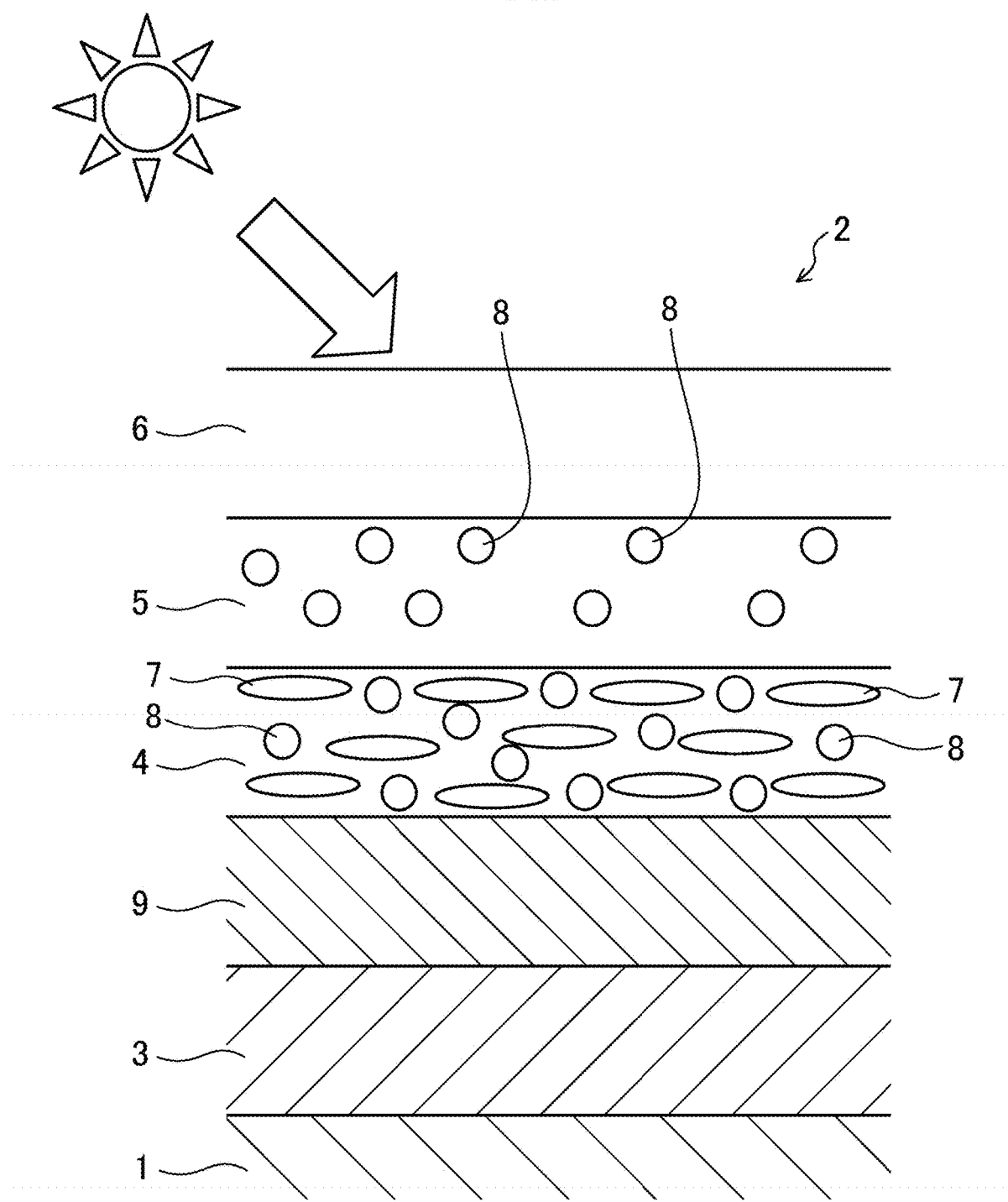
FIG. 1 is a cross-sectional view schematically illustrating a laminated coating film structure.

FIG. 1 schematically illustrates an example laminated coating film 2 provided on an outer surface of a vehicle body (steel sheet) 1 of an automobile. The laminated coating film 2 includes a metallic base layer (1BC) 4, a color clear layer (2BC) 5, and a transparent top clear layer 6 that are sequentially stacked. The metallic base layer 4 contains a bright material 7 and a pigment 8, and the color clear layer 5 contains the pigment 8. An electrodeposition coating film 3 is formed on the surface of the vehicle body 1 by cationic electrodeposition, an intermediate coating film 9 is formed on the electrodeposition coating film 3, and the laminated coating film 2 is provided on the intermediate coating film 9.

<Examination of Coloring Mechanism>

The present invention enables the laminated coating film 2 to provide high chroma and high lightness at the highlight, to provide an appearance of denseness, and further to provide an appearance of depth. A coloring mechanism for this will be described with reference to the case where a red color is produced as a target color.

Figure 2B:
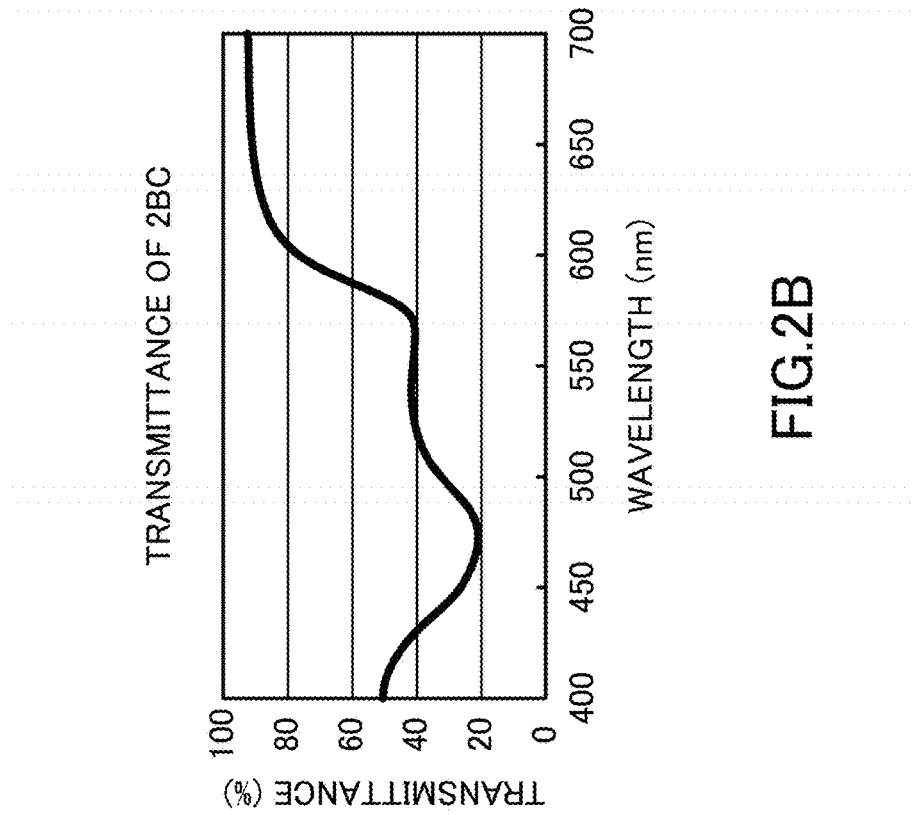
FIG. 2(B) is a graph illustrating an example spectral transmittance curve of the color clear layer.
Figure 2A:
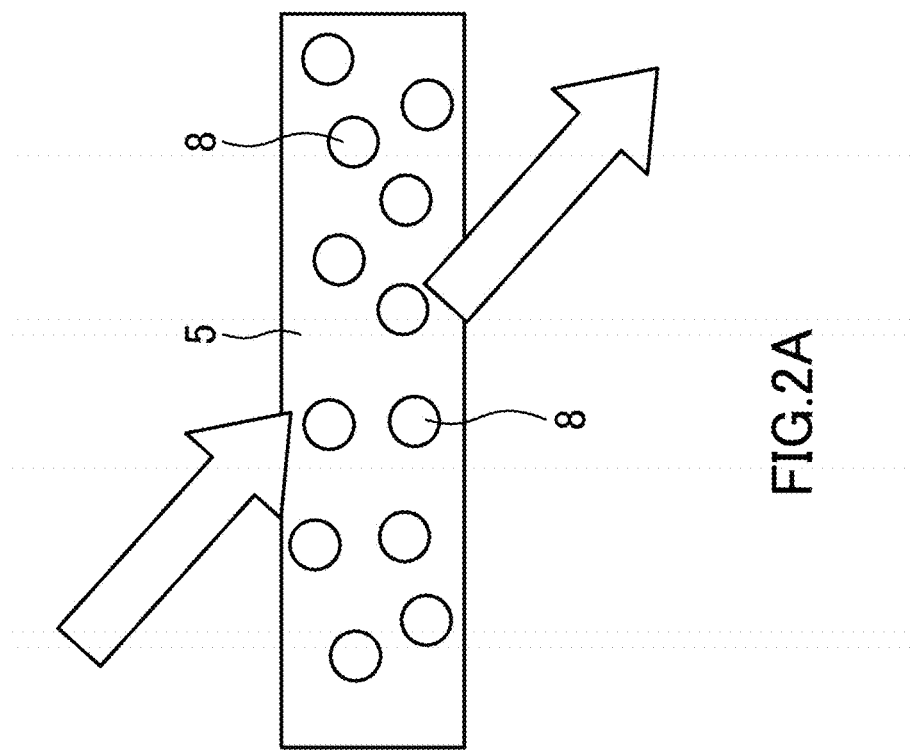
FIG. 2(A) is a cross-sectional view schematically illustrating how external light enters a color clear layer and passes through the color clear layer.

Light having passed through the top clear layer 6 enters the color clear layer 5 as illustrated in FIG. 2(A). FIG. 2(B) illustrates the spectral transmittance curve of the color clear layer 5 containing the red pigment 8. To achieve high chroma and high lightness, the color clear layer 5 is configured such that as much red light as possible passes through the color clear layer 5 and as much light as possible except the red light is absorbed by the color clear layer 5.

Figure 3:
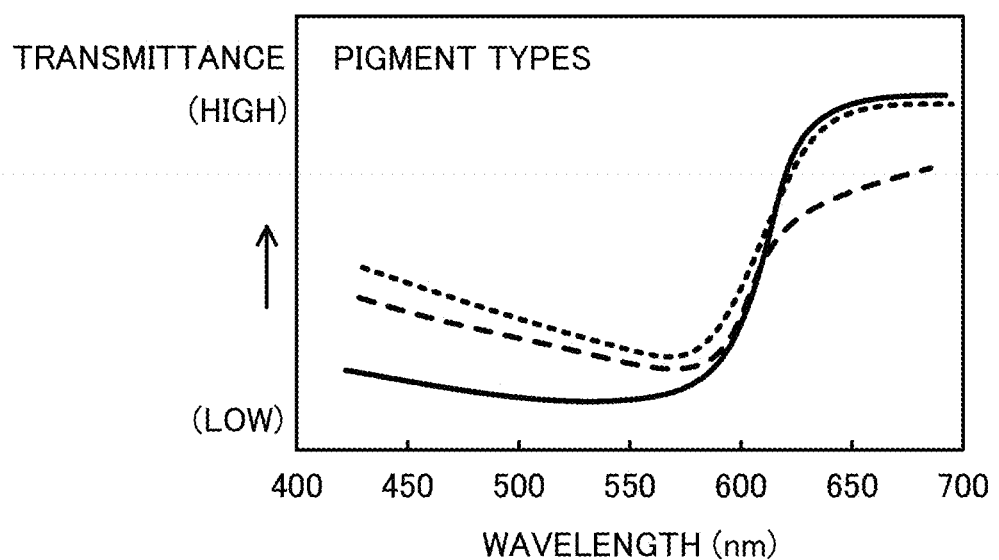
FIG. 3 is a graph illustrating an example of the influence of the type of a pigment of the color clear layer on the spectral transmittance curve.
Figure 4:
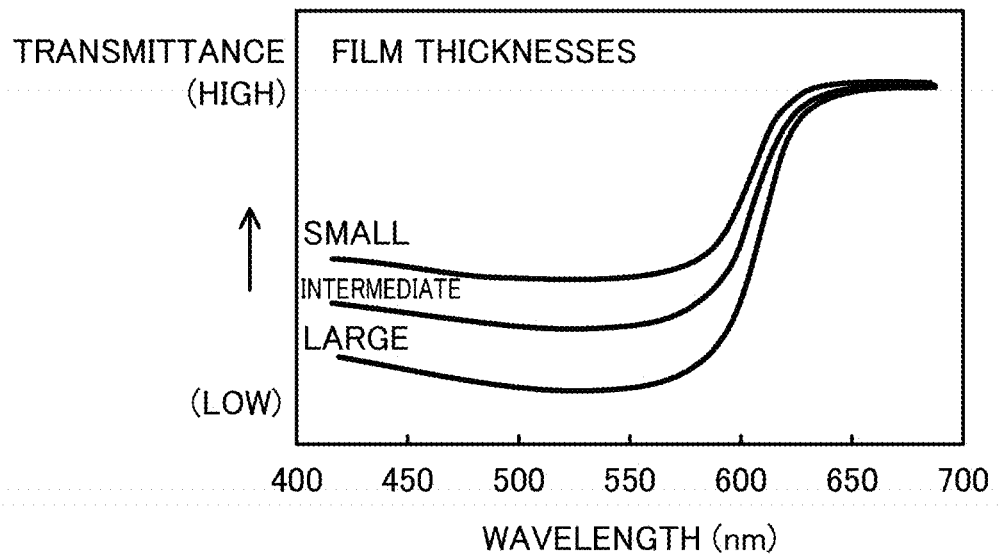
FIG. 4 is a graph illustrating an example of the influence of the thickness of the color clear layer on the spectral transmittance curve.

Principal control factors for this configuration include the type of the pigment 8 and the pigment amount (the pigment concentration or the thickness of the color clear layer). As illustrated in FIG. 3, the light transmittance versus wavelength characteristic varies depending on the type of the pigment. As illustrated in FIG. 4, with increasing thickness of the color clear layer, the light transmittance decreases as a whole. In FIG. 4, when the thickness of the color clear layer increases, the transmittance of red light does not decrease very much, whereas the transmittance of light except red light significantly decreases. In other words, a large amount of the light except the red light is absorbed.

Figure 5:
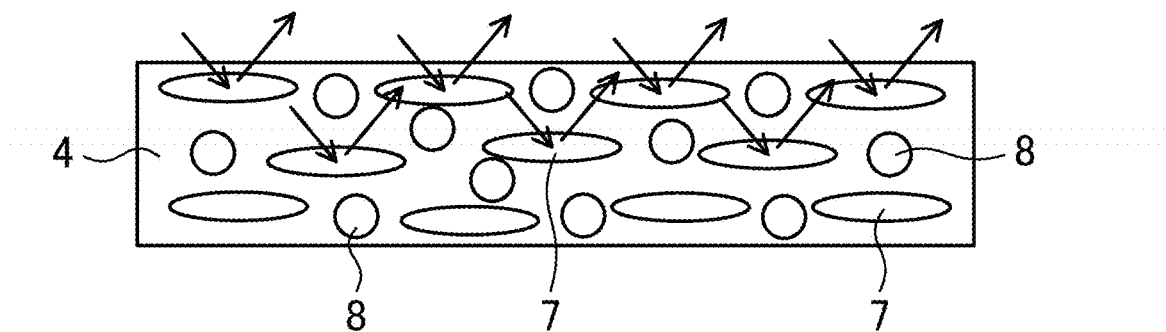
FIG. 5 is a cross-sectional view schematically illustrating how light is reflected off a bright material of a metallic base layer.

Light having passed through the color clear layer 5 is reflected off the metallic base layer 4 as illustrated in FIG. 5. The metallic base layer 4 is configured such that to increase the chroma, as much incident light as possible is reflected off the metallic base layer 4. Furthermore, the metallic base layer 4 is configured such that to enhance the appearance of depth, the flip-flop (FF, which means the degree of change in reflected light intensity with a change in observation angle) is increased. In addition, the metallic base layer 4 is configured such that to increase the chroma, red light is reflected off the metallic base layer 4 and as much light as possible except the red light is not reflected off the metallic base layer 4.

Figure 6:
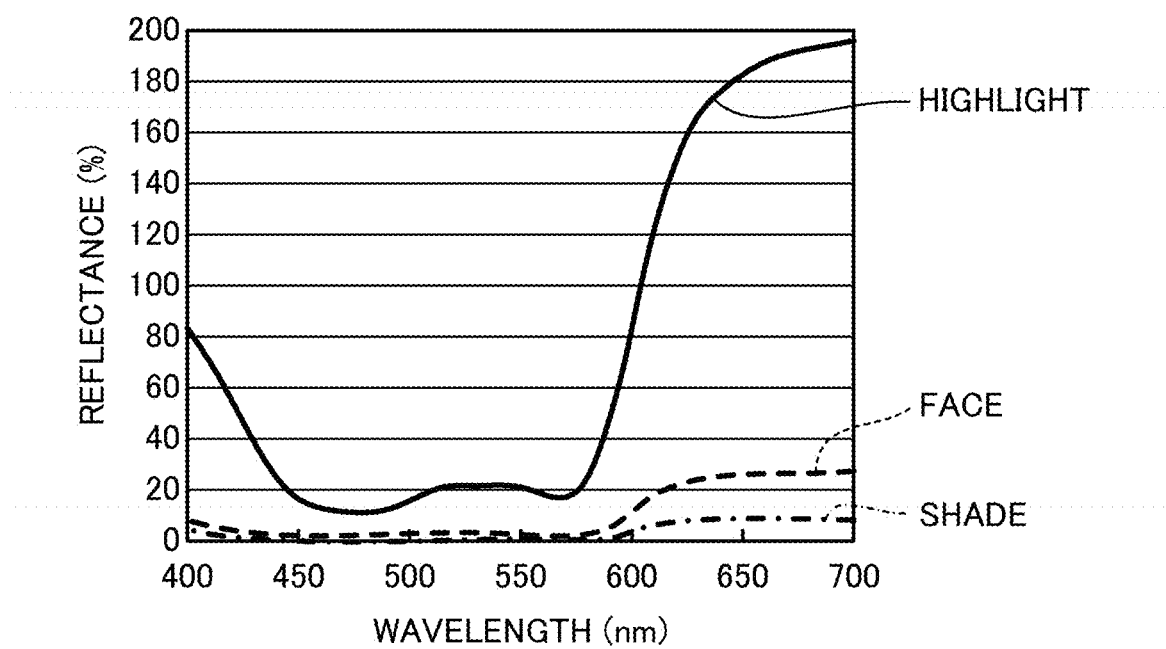
FIG. 6 is a graph illustrating an example spectral reflectance curve of the metallic base layer.

FIG. 6 illustrates example spectral reflectance curves of the metallic base layer 4. As illustrated in FIG. 6, a higher highlight reflectance, a lower shade reflectance, and a lower face reflectance of red light enhance the appearance of depth, and a lower reflectance of light except the red light increases the chroma. In this specification, the reflectance measured with reference to the reflectance of a standard white plate at a light incidence angle of 45 degrees and a light reception angle of +30 degrees is defined as the "highlight reflectance," the reflectance measured with reference to the reflectance of the standard white plate at a light incidence angle of 45 degrees and a light reception angle of 30 degrees is defined as the "shade reflectance," and the reflectance measured with reference to the reflectance of the standard white plate at a light incidence angle of 45 degrees and a light reception angle of 0 degree is defined as the "face reflectance."

Figure 7:
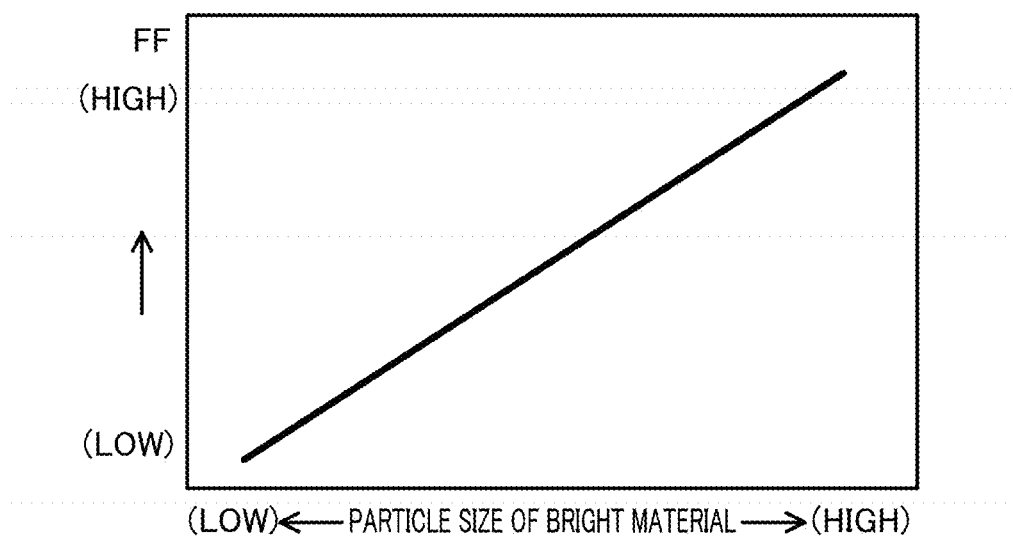
FIG. 7 is a graph illustrating an example of the influence of the particle size of the bright material of the metallic base layer on the flip-flop.
Figure 8:
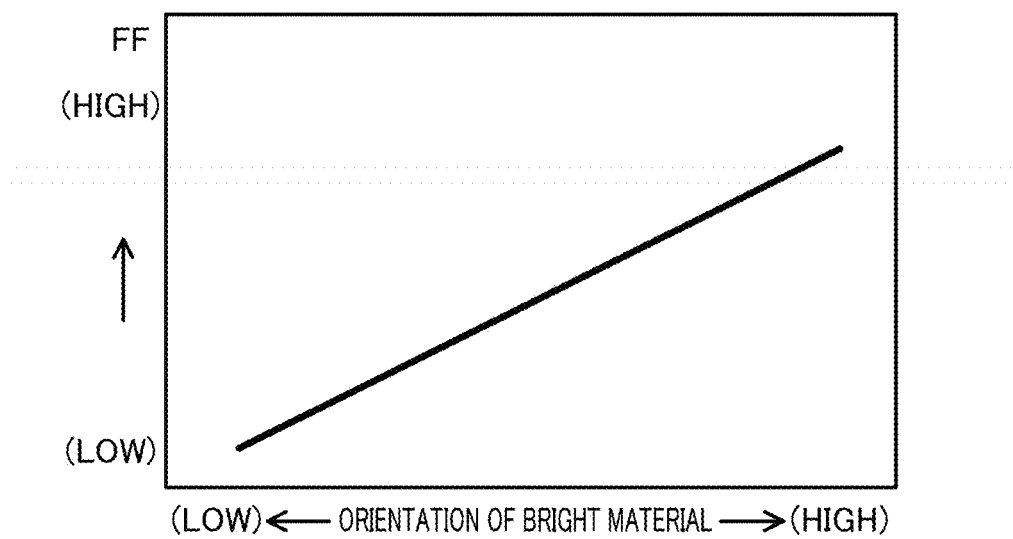
FIG. 8 is a graph illustrating an example of the influence of the orientation of the bright material of the metallic base layer on the flip-flop.

Principal control factors for achieving variations in reflected light intensity among angles include the type (the bright material type, particle size, and aspect ratio) of the bright material 7, the bright material amount (the bright material concentration or the thickness of the metallic base layer), and the orientation of the bright material 7. As illustrated in FIG. 7, with increasing particle size of the bright material 7, the FF increases. As illustrated in FIG. 8, with improvement in orientation of the bright material 7, the FF increases. Here, the orientation of the bright material 7 can be controlled by adjusting the coating conditions (the degree to which paint is atomized and the solvent evaporation characteristic) and the viscosity of the paint. With improvement in orientation of the bright material 7, the highlight reflectance increases, and the shade reflectance decreases. In other words, the difference between the highlight reflectance and the shade reflectance, i.e., the FF, increases.

As in the case of the color clear layer 5, principal control factors for reflecting red light off the metallic base layer 4 and preventing as much light as possible except the red light from being reflected off the metallic base layer 4 (absorbing light except the red light) include the type of the pigment 8 and the pigment amount (the pigment concentration or the thickness of the metallic base layer). The upper limits of the contents of the pigment and the bright material in the metallic base layer 4 in units of pwc are determined in terms of the coating quality. Thus, a balance must be achieved between the amount of the pigment 8 added to the metallic base layer 4 and the amount of the bright material 7 added thereto. For this reason, a balance needs to be achieved between the amount of the pigment 8 and the amount of the bright material 7 eventually in consideration of design and quality.

Figure 9:
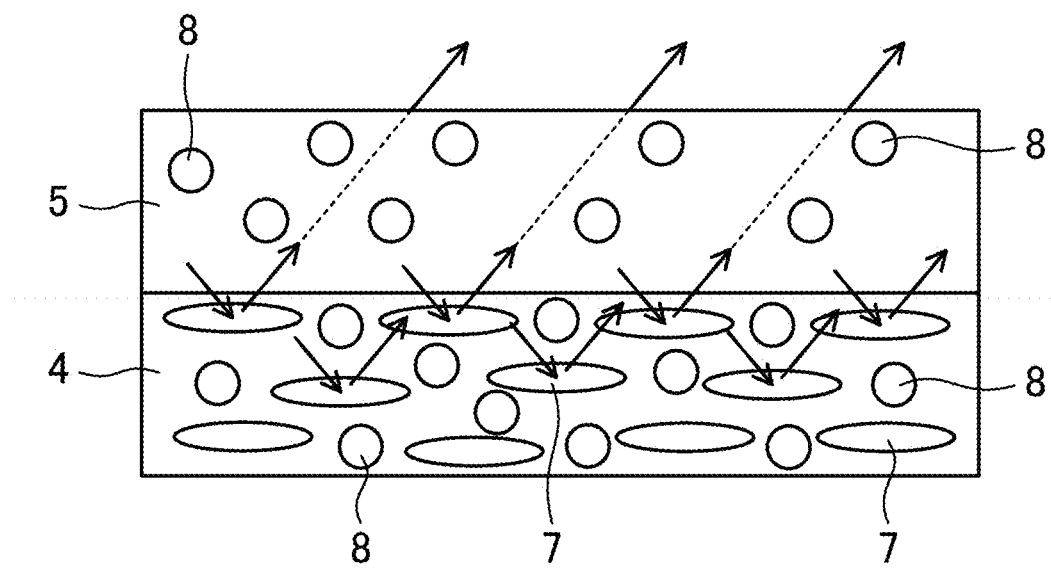
FIG. 9 is a cross-sectional view schematically illustrating how light reflected off the metallic base layer passes through the color clear layer.
Figure 10:
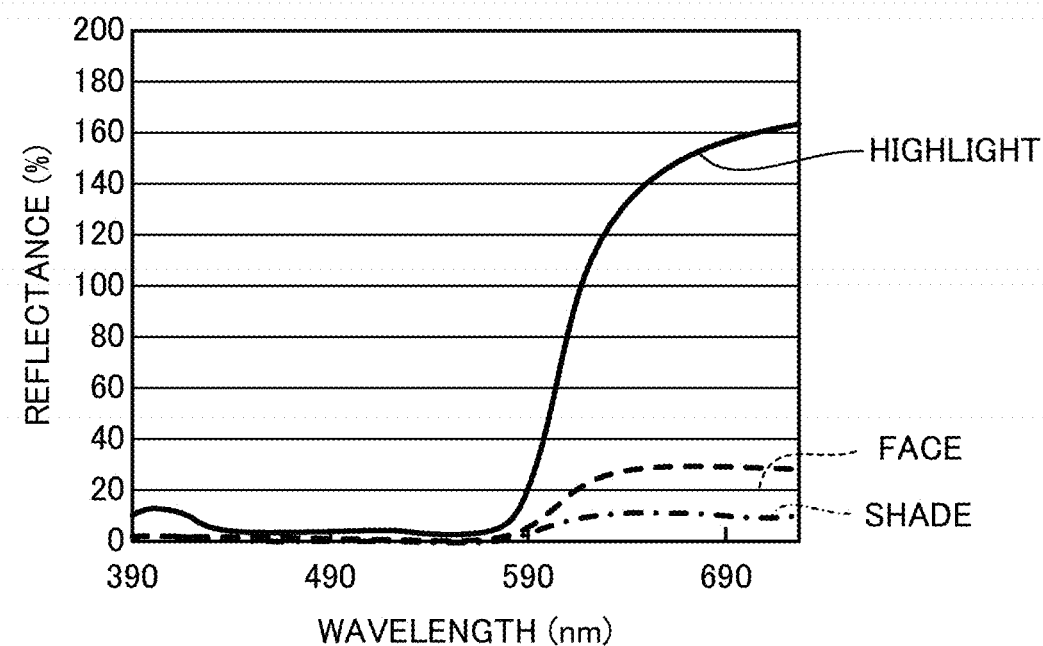
FIG. 10 is a graph illustrating an example spectral reflectance curve of a laminated coating film.

As illustrated in FIG. 9, light reflected off the metallic base layer 4 passes through the color clear layer 5, further passes through the top clear layer 6, and exits to the outside. FIG. 10 illustrates example spectral reflectance curves of light finally exiting from the top clear layer 6. A comparison between FIG. 6 and FIG. 10 shows that in FIG. 10, the influence of, for example, absorption and reflection of light in and off the pigment 8 contained in the color clear layer 5 causes the whole highlight reflectance in FIG. 10 to be slightly lower than that in FIG. 6.

FIG. 10 shows that the highlight reflectance is high, the difference between the highlight reflectance and the shade reflectance and the difference between the highlight reflectance and the face reflectance are great, and light except the red light hardly exits from the laminated coating film 2. This shows that high lightness and high chroma are achieved at the highlight and that an appearance of great depth is provided. In particular, in the case where the difference between the highlight reflectance and the face reflectance is great, the tone of a color sharply changes as the observation angle changes. Thus, an appearance of great depth is provided.

<Planning of Conditions for Achieving Higher Lightness, Higher Chroma, Appearance of Denseness, and Appearance of Depth>

The examination of the coloring mechanism shows that the highlight reflectance, shade reflectance, and face reflectance of light of a target color, the transmittance of light of the target color, and the transmittance of light of colors except the target color affect the lightness and chroma of a laminated coating film and the appearance of depth of the laminated coating film. Thus, a plurality of laminated coating film samples were prepared, and measurements were made of, e.g., the reflectances and light transmittance of each sample, thereby evaluating the chroma, the appearance of depth, and the appearance of denseness.

[Preparation of Samples]

The following samples were prepared.

Red-Based Sample No. 1

In the composition of the coating film illustrated in FIG. 1, a laminated coating film 2 was formed such that an intermediate coating film 9 (having a lightness L* of 50) was placed on an epoxy-based electrodeposition coating film 3 on a surface of a steel sheet 1, and a metallic base layer (1BC) 4, a color clear layer (2BC) 5, and a top clear layer 6 were sequentially stacked on the intermediate coating film 9. A polyester-based solvent paint was used for the intermediate coating film 9. The intermediate coating film 9 has a thickness of 25 µm.

The metallic base layer 4 was formed of an acrylic melamine-based solvent paint with a rotary atomizing electrostatic coating apparatus. The paint contained 10% (pwc) of aluminum flakes serving as a bright material 7 and 15% (pwc) of a perylene-based pigment serving as a color pigment 8. The coating conditions were determined such that the discharge rate of the paint was 330 cc/min, the rotational speed was 20,000 rpm, and the flow rate of shaping air (S/A) was 420 nl/min. The metallic base layer 4 has a thickness of 12 µm.

The color clear layer 5 was also formed of an acrylic melamine-based solvent paint by the rotary atomizing electrostatic coating apparatus. The paint contained 2.0% (pwc) of a perylene-based pigment serving as the color pigment 8. The coating conditions were determined such that the discharge rate of the paint was 300 cc/min, the rotational speed was 20,000 rpm, and the S/A flow rate was 300 nl/min. The color clear layer 5 has a thickness of 12 µm.

The top clear layer 6 was formed of an acid epoxy-based clear paint. The top clear layer 6 has a thickness of 30 µm. The paint for intermediate coating, the paint for metallic base coating, the paint for color clear coating, and the paint for top clear coating were applied to the epoxy-based electrodeposition coating film 3 using a wet-on-wet technique, and then were baked (heated for 20 minutes at 140° C.).

Red-Based Samples Nos. 2-10

The orientation of the bright material 7 of the red-based sample No. 1 was changed by adjusting the coating conditions for forming the metallic base layer 4. As a result, red-based samples Nos. 2-10 different from one another in the highlight reflectance, shade reflectance, and face reflectance of the metallic base coating film 4 were prepared. The paint composition of the metallic base layer 4, the color clear layer 5, the top clear layer 6, and the intermediate coating film 9 of each of the red-based samples Nos. 2-10 are identical to those of the red-based sample No. 1.

Red-Based Sample No. 11

In the red-based sample No. 11, a laminated coating film 2 was formed such that a metallic base layer (1BC) 4, a color clear layer (2BC) 5, and a top clear layer 6 were sequentially stacked on an electrodeposition coating film 3 without an intermediate coating film.

The metallic base layer 4 was formed of an acrylic emulsion water based paint with the rotary atomizing electrostatic coating apparatus. The paint contained 18% (pwc) of aluminum flakes serving as a bright material 7 and 5.0% (pwc) of a diketo-pyrrolo-pyrrole-based pigment serving as a color pigment 8. The coating conditions were determined such that the discharge rate of the paint was 330 cc/min, the rotational speed was 30000 rpm, and the S/A flow rate was 420 nl/min. The metallic base layer 4 has a thickness of 10 µm.

The color clear layer 5 was also formed of an acrylic emulsion water based paint by the rotary atomizing electrostatic coating apparatus. The paint contained 2.0% (pwc) of a perylene-based pigment serving as a color pigment 8. The coating conditions were determined such that the discharge rate of the paint was 300 cc/min, the rotational speed was 20,000 rpm, and the S/A flow rate was 300 nl/min. The color clear layer 5 has a thickness of 10 µm.

The top clear layer 6 was formed of a two-component urethane clear paint. The top clear layer 6 has a thickness of 30 µm. The paint for metallic base coating and the paint for color clear coating were applied to the epoxy-based electrodeposition coating film 3 using the wet-on-wet technique, were then preheated (heated for three minutes at 80° C.), and were baked (heated for 20 minutes at 140° C.) after top clear coating.

Red-Based Sample No. 12

A laminated coating film was formed (by a three-coat, one-bake process) such that an intermediate coating film (having a lightness L* of 30) was placed on an epoxy-based electrodeposition coating film on a surface of a steel sheet, and a metallic base layer and a color clear layer were sequentially stacked on the intermediate coating film. A polyester-based solvent paint was used for the intermediate coating film. The intermediate coating film has a thickness of 25 µm.

The metallic base layer was formed of an acrylic melamine-based solvent paint with the rotary atomizing electrostatic coating apparatus. The paint contained 8% (pwc) of aluminum flakes serving as a bright material and 14% (pwc) of a perylene-based pigment serving as a color pigment. The coating conditions were determined such that the discharge rate of the paint was 330 cc/min, the rotational speed was 20,000 rpm, and the S/A flow rate was 420 nl/min. The metallic base layer has a thickness of 15 µm.

The color clear layer was also formed of an acid epoxy-based clear paint by the rotary atomizing electrostatic coating apparatus. The paint contained 1.0% (pwc) of a perylene-based pigment serving as the color pigment. The color clear layer has a thickness of 30 µm. The paint for intermediate coating, the paint for metallic base coating, the paint for color clear coating, and the paint for top clear coating were applied to the epoxy-based electrodeposition coating film using the wet-on-wet technique, and were then baked (heated for 20 minutes at 140° C.).

Red-Based Sample No. 13

A laminated coating film was formed (by a five-coat, two-bake process) such that an intermediate coating layer and a metallic base layer were formed as in the sample No. 12 and then a clear layer, a color clear layer, and a top clear layer were sequentially stacked on the metallic base layer.

The color clear layer was formed of an acrylic melamine-based solvent paint with the rotary atomizing electrostatic coating apparatus. The paint contained 2.0% (pwc) of a perylene-based pigment serving as a color pigment. The coating conditions were determined such that the discharge rate of the paint was 330 cc/min, the rotational speed was 20,000 rpm, and the S/A flow rate was 300 nl/min. The color clear layer has a thickness of 12 µm. The clear layer and the top clear layer were formed of an acid epoxy-based clear paint. The layers have a thickness of 30 µm. The paint for intermediate coating, the paint for base coating, and the paint for clear coating were applied to the epoxy-based electrodeposition coating film using the wet-on-wet technique, and then were baked (heated for 20 minutes at a temperature of 140° C.). Moreover, the paint for color clear coating and the paint for top clear coating were applied to the resultant object using the wet-on-wet technique, and then were re-baked (re-heated for 20 minutes at 140° C.).

Blue-Based Sample No. 1

In the composition of the coating film illustrated in FIG. 1, a laminated coating film 2 was formed such that an intermediate coating film 9 (having a lightness L* of 30) was placed on an epoxy-based electrodeposition coating film 3 on a surface of a steel sheet 1, and a metallic base layer (1BC) 4, a color clear layer (2BC) 5, and a top clear layer 6 were sequentially stacked on the intermediate coating film 9. A polyester-based solvent paint was used for the intermediate coating film 9. The intermediate coating film 9 has a thickness of 25 µm.

The metallic base layer 4 was formed of an acrylic melamine-based solvent paint by spray coating. The paint contained 20% (pwc) of aluminum flakes serving as a bright material 7. The metallic base layer 4 has a thickness of 12 µm.

The color clear layer 5 was also formed of an acrylic melamine-based solvent paint by spray coating. The paint contained 1.0% (pwc) of a phthalocyanine-based pigment serving as a color pigment 8. The color clear layer 5 has a thickness of 20 µm.

The top clear layer 6 was formed of an acid epoxy-based clear paint. The top clear layer 6 has a thickness of 30 µm. The paint for intermediate coating, the paint for metallic base coating, the paint for color clear coating, and the paint for top clear coating were applied to the epoxy-based electrodeposition coating film 3 using the wet-on-wet technique, and then were baked (heated for 20 minutes at 140° C.).

Blue-Based Sample No. 2

In the composition of the coating film illustrated in FIG. 1, a laminated coating film 2 was formed such that an intermediate coating film 9 (having a lightness L* of 10) was placed on an epoxy-based electrodeposition coating film 3 on a surface of a steel sheet 1, and a metallic base layer (1BC) 4, a color clear layer (2BC) 5, and a top clear layer 6 were sequentially stacked on the intermediate coating film 9. A polyester-based solvent paint was used for the intermediate coating film 9. The intermediate coating film 9 has a thickness of 25 µm.

The metallic base layer 4 was formed of an acrylic melamine-based solvent paint by spray coating. The paint contained 17% (pwc) of aluminum flakes serving as a bright material 7 and 4% of a phthalocyanine-based pigment. The metallic base layer 4 has a thickness of 12 µm.

The color clear layer 5 was also formed of an acrylic melamine-based solvent paint by spray coating. The paint contained 1.0% (pwc) of a phthalocyanine-based pigment serving as a color pigment 8. The color clear layer 5 has a thickness of 20 µm.

The top clear layer 6 was formed of an acid epoxy-based clear paint. The top clear layer 6 has a thickness of 30 µm. The paint for intermediate coating, the paint for metallic base coating, the paint for color clear coating, and the paint for top clear coating were applied to the epoxy-based electrodeposition coating film 3 using the wet-on-wet technique, and then were baked (heated for 20 minutes at 140° C.).

Commercially Available Samples Nos. 1 and 2

Two types of samples (Red Mica 1 and Red Mica 2) of commercially available automobiles coated with different colors were prepared.

Applicant's Currently Available Samples Nos. 1-10

Ten types of samples of commercially available automobiles manufactured by the applicant of this application and coated with different colors were prepared.

[Evaluation on Color Properties of Laminated Coating Film]

Measurements were made of the highlight reflectance $R^{H(P)}$, shade reflectance $R^{S(P)}$, and face reflectance $R^{F(P)}$ of a target color off each sample and the average highlight reflectance $R^{H(OA)}$ of light in a wavelength range outside the hue range of the target color off each sample. Moreover, the chroma, appearance of depth, and appearance of denseness of each sample were visually evaluated. The reflectances were measured using a Gonio-Spectrophotometric Color Measurement System GCMS-4 manufactured by Murakami Color Research Laboratory Co., Ltd. The transmittances described below were measured using an ultraviolet visible spectrometer UV-2450 manufactured by Shimadzu Corporation. The wavelength range in which the reflectances and the transmittances were measured was 400-700 nm.

Figure 11:
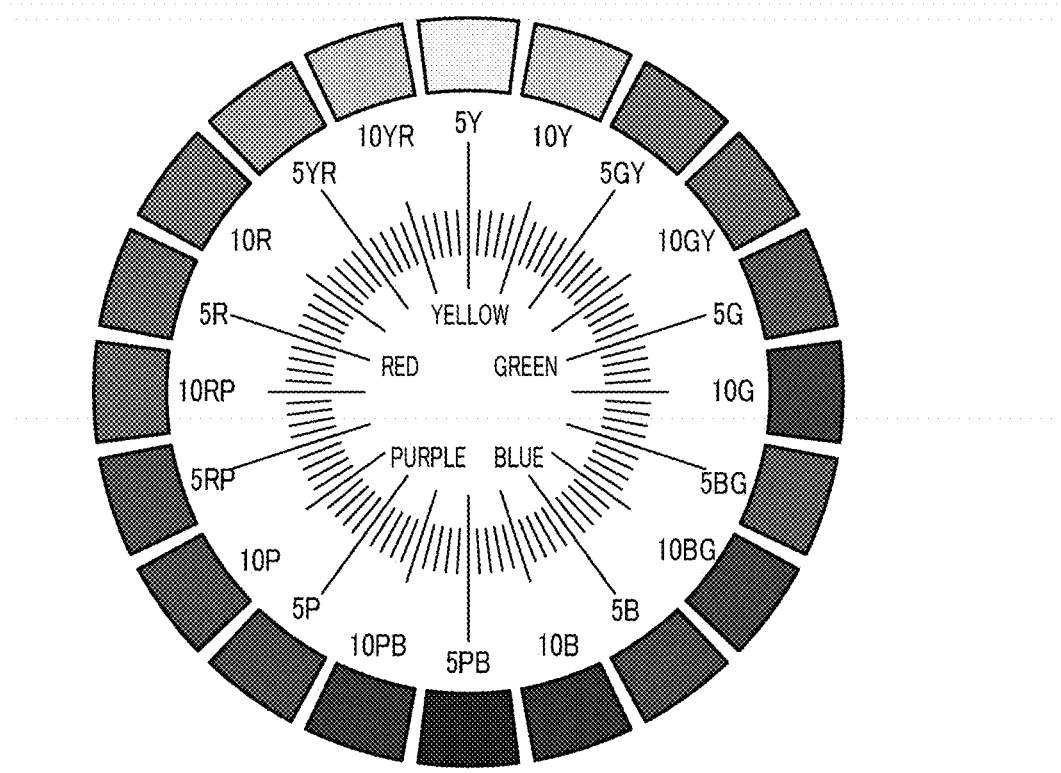
FIG. 11 illustrates a Munsell hue circle.

In this specification, when a hue range is indicated by dividing the Munsell hue circle into one hundred sectors with the hue of the target color set at a median value (0) of the Munsell hue circle illustrated in FIG. 11, and increasing the hue number to +50 in the counterclockwise direction while decreasing the hue number to −50 in the clockwise direction, the range of the hue number from −25 to +25 (the range of ±25) corresponds to the hue range of the target color.

Figure 12:
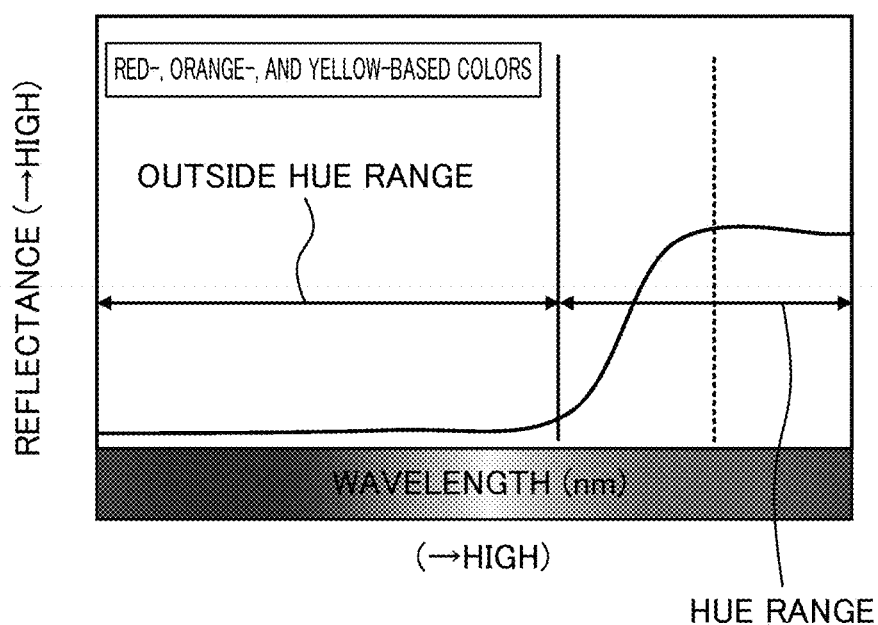
FIG. 12 is a graph for explaining the setting of the peak wavelength of light of a red-, orange-, or yellow-based target color and the hue range of the target color.

FIG. 12 illustrates the hue range obtained when the target color is a red-, orange-, or yellow-based color. The hue range is defined by a wavelength range in the visible region (400-700 nm). In the case of the red-, orange-, yellow-based color, a median wavelength (indicated by the broken line in FIG. 12) in the increasing wavelength range from the wavelength at which with increasing wavelength, the spectral reflectance starts increasing to a maximum wavelength of 700 nm corresponds to a "peak wavelength" of the hue of the target color. The reflectances $R^{H(P)}$, $R^{S(P)}$, and $R^{F(P)}$ are the reflectances of light of the peak wavelength. A wavelength range corresponding to the range from +25 to −25 with respect to the peak wavelength in the Munsell hue circle is the hue range of the target color, and the remaining wavelength ranges are the wavelength ranges outside the hue range.

Figure 13:
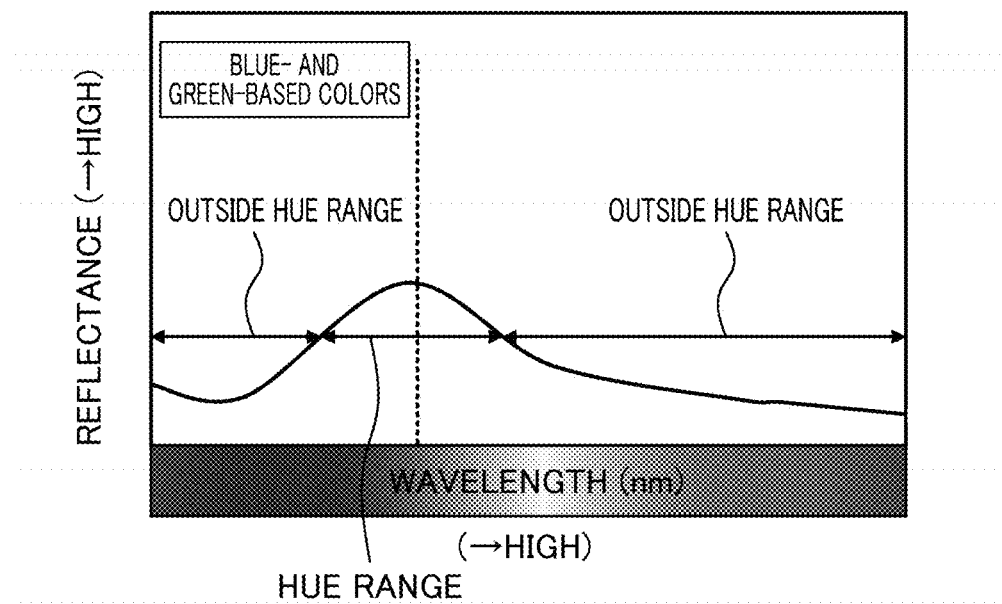
FIG. 13 is a graph for explaining the setting of the peak wavelength of light of a blue- or green-based target color and the hue range of the target color.

FIG. 13 illustrates the hue range obtained when the target color is a blue- or green-based color. The hue range is defined by a wavelength range. In the case of the blue- or green-based color, the wavelength at which the spectral reflectance reaches its peak (indicated by the broken line in FIG. 13) corresponds to the "peak wavelength." A wavelength range corresponding to the range from +25 to −25 with respect to the peak wavelength in the Munsell hue circle is the hue range of the target color, and the remaining wavelength ranges are the wavelength ranges outside the hue range.

Figure 14:
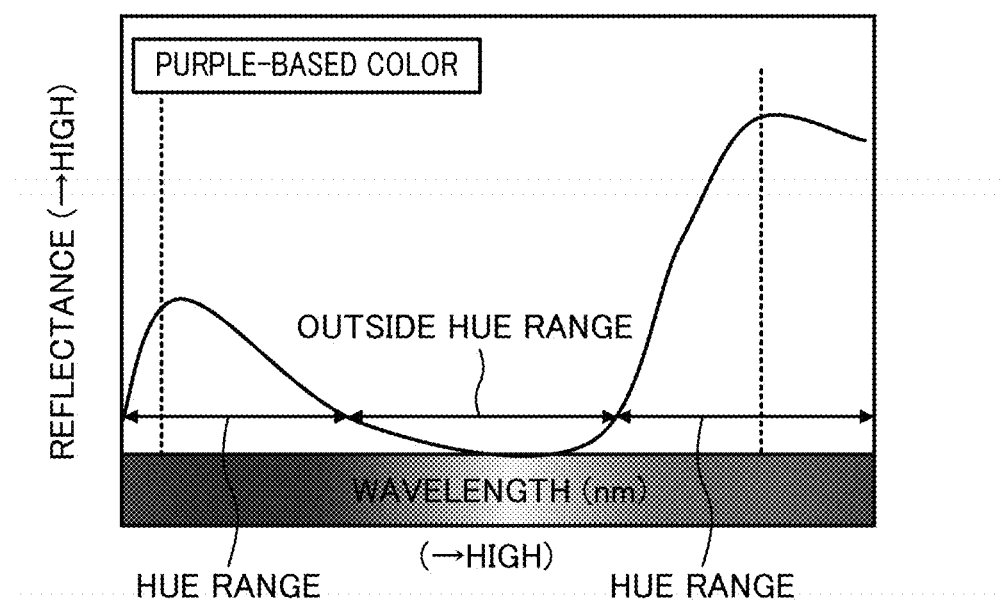
FIG. 14 is a graph for explaining the setting of the peak wavelength of light of a purple-based target color and the hue ranges of the target color.

FIG. 14 illustrates the hue ranges obtained when the target color is a purple-based color. The hue ranges are defined by wavelength ranges. In the case of the purple-based color, two peak spectral reflectances (indicated by the broken lines in FIG. 14) appear in a short-wavelength region and a long-wavelength region. The wavelength of light with a higher one of the two peak spectral reflectances corresponds to the "peak wavelength." A wavelength range corresponding to the range from +25 to −25 with respect to each peak spectral reflectance in the Munsell hue circle is the hue range of the target color, and the remaining wavelength range outside the range from +25 to −25 with respect to each peak spectral reflectance in the Munsell hue circle corresponds to the wavelength range outside the hue ranges.

Measurements were made of the highlight reflectance $R_{1BC}^{H(P)}$, shade reflectance $R_{1BC}^{S(P)}$, and face reflectance $R_{1BC}^{F(P)}$ of the target color off the metallic base layer (1BC) 4 of each of the red-based samples Nos. 1-11 and the blue-based samples Nos. 1 and 2, the difference $(R_{1BC}^{H(P)} - R_{1BC}^{S(P)})$ between the highlight reflectance $R_{1BC}^{H(P)}$ and the shade reflectance $R_{1BC}^{S(P)}$, a maximum highlight reflectance $R_{1BC}^{H(O\text{-}MAX)}$ of light in a wavelength range outside the hue range of the target color off the metallic base layer 4, the light transmittance $T_{2BC}^{(O\text{-}MAX)}$ of the color clear layer 5 of each of the red-based samples Nos. 1-11 and the blue-based samples Nos. 1 and 2 at the wavelength of the light with the maximum highlight reflectance, and the value $R_{1BC}^{H(O\text{-}MAX)} \times (T_{2BC}^{(O\text{-}MAX)}/100)^2$.

Furthermore, measurements were made of the transmittance $T_{2BC}^{(P)}$ of light of the target color through the color clear layer (2BC) 5 of each of the red-based samples Nos. 1-11 and the blue-based samples Nos. 1 and 2, the average transmittance $T_{2BC}^{(OA)}$ of light in a wavelength range outside the hue range of the target color, and the average transmittance $T_{2BC}^{(TA)}$ of light in the visible region (400-700 nm).

The criteria for visual evaluation are as follows.

| | |
|---|---|
| Chroma | Double Circle: "Appearance of High Brightness" |
| | White Circle: "Appearance of Brightness" |
| | White Triangle: "Appearance of Slight Brightness" |
| | Cross Mark: "No Appearance of Brightness" |
| Depth | Double Circle: "Appearance of Great Depth" |
| | White Circle: "Appearance of Depth" |
| | White Triangle: "Appearance of Slight Depth" |
| | Cross Mark: "No Appearance of Depth" |
| Denseness | Double Circle: "Appearance of No Granularity" |
| | White Circle: "Appearance of Slight Granularity" |
| | White Triangle: "Appearance of Granularity" |
| | Cross Mark: "Appearance of Great Granularity" |

[Measurement and Evaluation Results]

Figure 15:
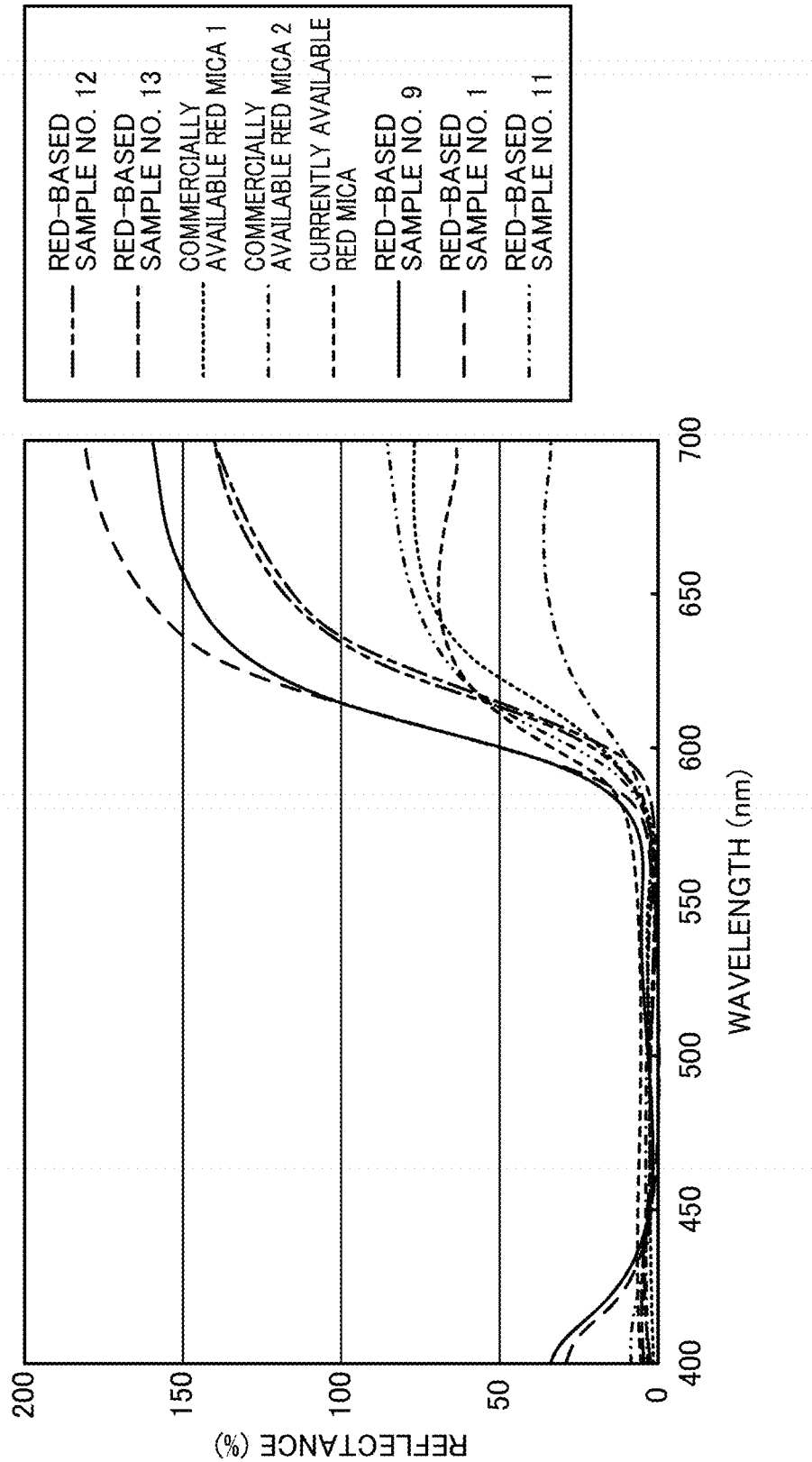
FIG. 15 is a graph illustrating the spectral reflectance curves corresponding to the highlight reflectances of a plurality of red-based samples.
Figure 16:
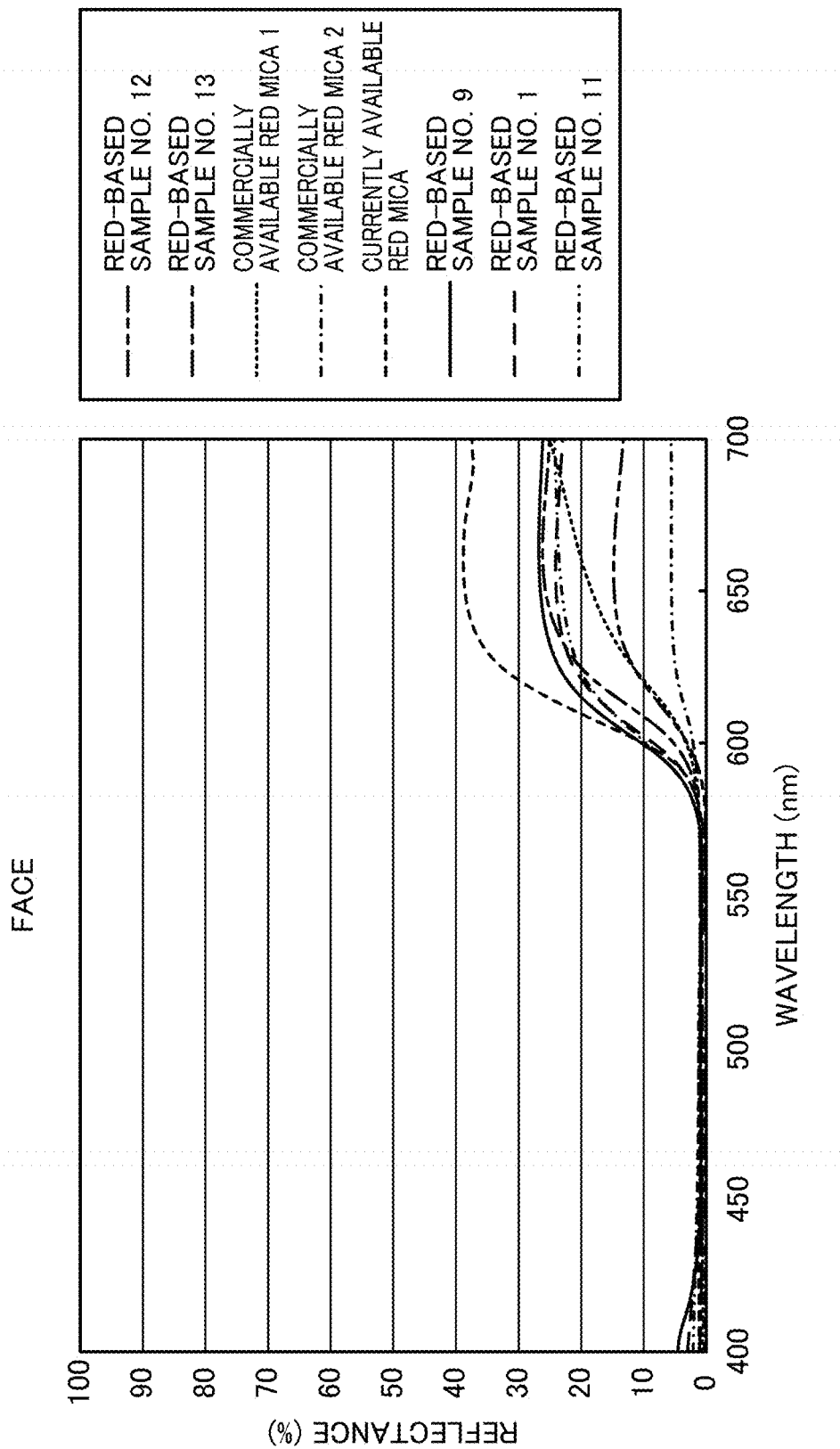
FIG. 16 is a graph illustrating the spectral reflectance curves corresponding to the face reflectances of the red-based samples.
Figure 17:
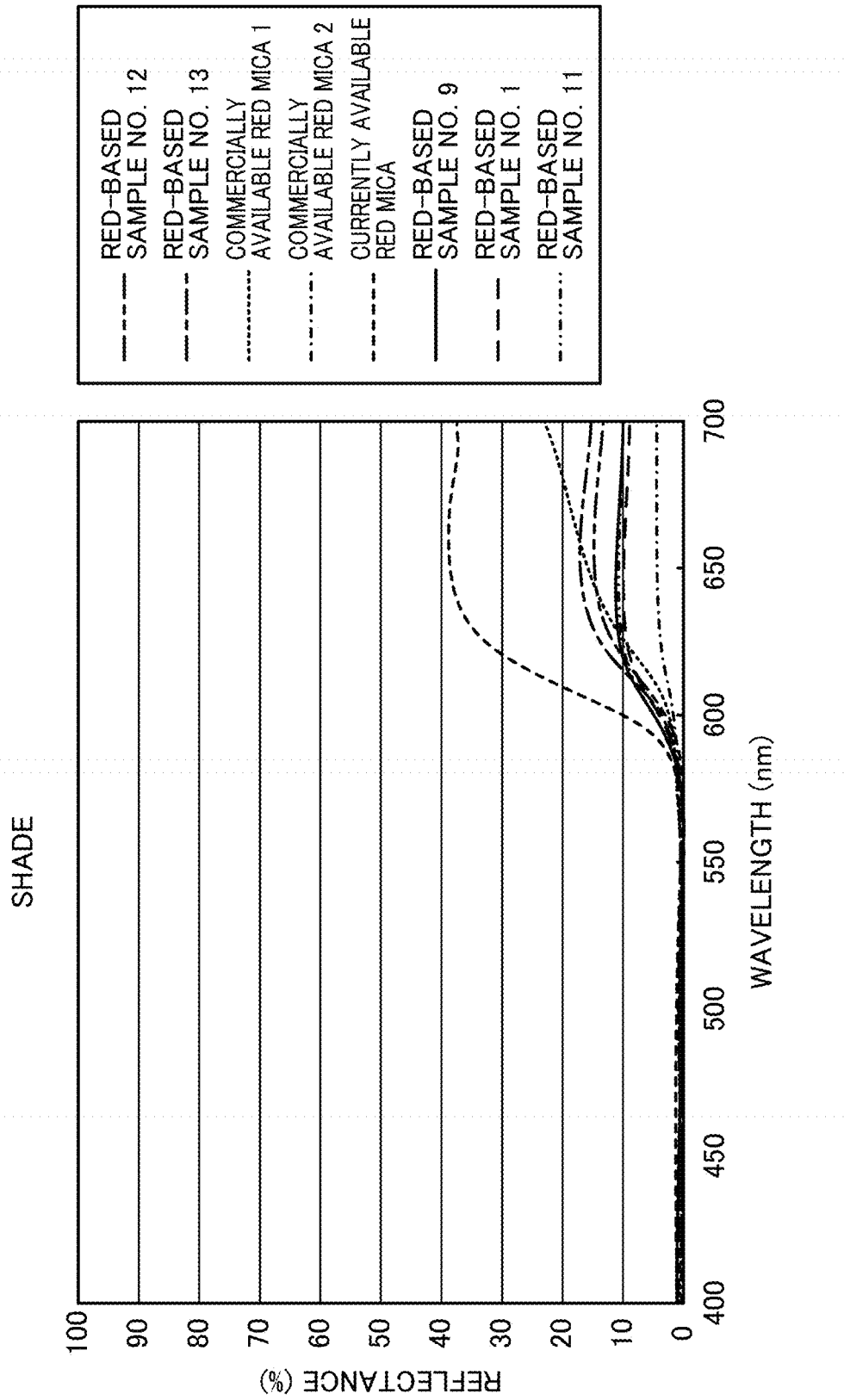
FIG. 17 is a graph illustrating the spectral reflectance curves corresponding to the shade reflectances of the red-based samples.
Figure 18:
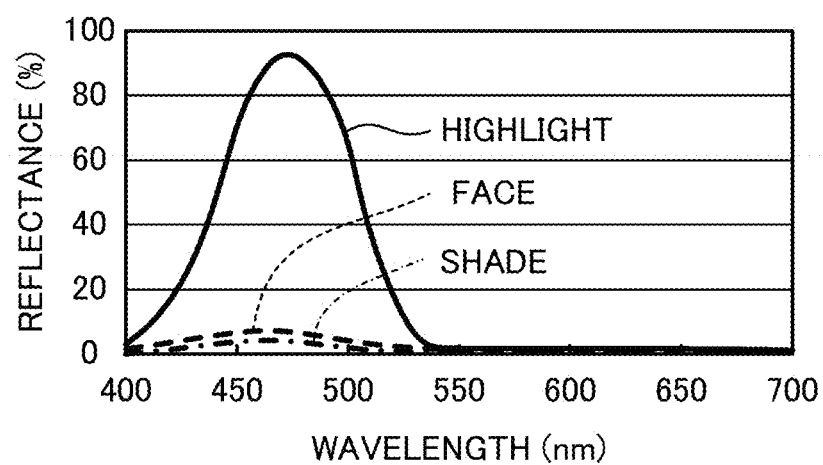
FIG. 18 is a graph illustrating the spectral reflectance curves corresponding to the highlight reflectance, face reflectance, and shade reflectance of a blue-based sample.

Measurement and evaluation results of the foregoing color properties are shown in Tables 1 and 2. FIGS. 15, 16, and 17 illustrate spectral reflectance curves showing the highlight reflectances, face reflectances, and shade reflectances of some of the red-based samples, and FIG. 18 illustrates spectral reflectance curves showing the highlight reflectance, face reflectance, and shade reflectance of the blue-based sample No. 1.

TABLE 1

|  |  | TARGET COLOR | | | OUTSIDE HUE RANGE ④ | VISUAL EVALUATION | |
|---|---|---|---|---|---|---|---|
|  |  | ① HIGHLIGHT REFLECTANCE (%) | ② FACE REFLECTANCE (%) | ③ SHADE REFLECTANCE (%) | AVERAGE HIGHLIGHT REFLECTANCE (%) | | |
|  |  | $R^{H(P)}$ | $R^{F(P)}$ | $R^{S(P)}$ | $R^{H(OA)}$ | CHROMA | DEPTH |
| RED-BASED SAMPLES | No. 1 | 180.7 | 23.2 | 8.8 | 1.4 | ◎ | ◎ |
|  | No. 2 | 140.4 | 25.5 | 10.7 | 1.7 | ○ | ○ |
|  | No. 3 | 122.6 | 27.5 | 11.7 | 1.4 | ○ | ○ |
|  | No. 4 | 125.5 | 26.9 | 11.6 | 1.5 | ○ | ○ |
|  | No. 5 | 144.1 | 25.6 | 10.9 | 1.5 | ○ | ○ |
|  | No. 6 | 130.5 | 27.5 | 11.5 | 1.2 | ◎ | ○ |
|  | No. 7 | 140.7 | 27.1 | 11.1 | 2.1 | ○ | ○ |
|  | No. 8 | 142.3 | 25.1 | 10.6 | 1.1 | ◎ | ○ |
|  | No. 9 | 140.4 | 26.3 | 10.9 | 1.8 | ○ | ○ |
|  | No. 10 | 151.4 | 26.5 | 10.7 | 2.4 | ○ | ○ |
|  | No. 11 | 84.1 | 24.1 | 9.9 | 1.3 | ○ | ○ |
|  | No. 12 | 139.4 | 22.9 | 13.4 | 0.9 | ◎ | ◎ |
|  | No. 13 | 140.4 | 24.9 | 15.3 | 1.2 | ◎ | ○ |
| BLUE-BASED SAMPLES | No. 1 | 92.9 | 5.6 | 2.0 | 0.2 | ◎ | ◎ |
|  | No. 2 | 59.5 | 2.3 | 0.5 | 0.3 | ◎ | ◎ |
| COMMERCIALLY AVAILABLE SAMPLES | RED MICA 1 | 75.8 | 24.9 | 22.9 | 1.9 | X | X |
|  | RED MICA 2 | 33.0 | 5.6 | 4.4 | 1.4 | X | Δ |
| CURRENTLY AVAILABLE SAMPLES | RED MICA | 73.4 | 37.0 | 35.6 | 4.6 | ○ | X |
|  | RED METALLIC | 62.0 | 9.0 | 3.0 | 2.8 | Δ | Δ |
|  | ORANGE METALLIC | 151.7 | 17.0 | 6.7 | 19.0 | Δ | Δ |
|  | PURPLE MICA | 4.8 | 0.5 | 0.2 | 0.8 | X | Δ |
|  | ORANGE MICA | 56.4 | 29.0 | 24.2 | 5.1 | X | X |
|  | BLUE MICA | 11.5 | 0.9 | 0.4 | 2.2 | X | Δ |
|  | BLUE METALLIC | 48.8 | 8.0 | 3.4 | 4.6 | X | Δ |
|  | YELLOW METALLIC | 80.0 | 26.0 | 18.3 | 17.8 | X | X |
|  | GREEN METALLIC | 169.2 | 20.0 | 8.3 | 44.0 | ○ | X |
|  | GREEN MICA | 4.4 | 0.4 | 0.4 | 0.8 | X | X |
| OPTIMUM RANGE | SUITABLE RANGE |  |  |  | <3 |  |  |
|  | MOST SUITABLE RANGE |  |  |  | <3 |  |  |

|  |  | VISUAL EVALUATION APPEARANCE OF DENSENESS | CONDITIONS FOR COLORING | | |
|---|---|---|---|---|---|
|  |  |  | CONDITION A APPEARANCE OF HIGH CHROMA $R^{H(P)}/R^{H(OA)}$ | CONDITION B APPEARANCE OF DEPTH $A*(R^{H(P)} - R^{S(P)})/100$ | CONDITION C APPEARANCE OF GREAT DEPTH $B/R^{F(P)}$ |
| RED-BASED SAMPLES | No. 1 | ◎ | 129.1 | 221.9 | 9.6 |
|  | No. 2 | ○ | 84.0 | 109.0 | 4.3 |
|  | No. 3 | ○ | 88.5 | 98.1 | 3.6 |
|  | No. 4 | ○ | 84.3 | 96.0 | 3.6 |
|  | No. 5 | ◎ | 98.3 | 131.0 | 5.1 |
|  | No. 6 | ○ | 110.3 | 131.2 | 4.8 |
|  | No. 7 | ○ | 66.4 | 86.1 | 3.2 |
|  | No. 8 | ○ | 126.8 | 167.0 | 6.7 |
|  | No. 9 | ○ | 77.3 | 100.1 | 3.8 |
|  | No. 10 | ◎ | 63.4 | 89.2 | 3.4 |
|  | No. 11 | ○ | 64.7 | 48.0 | 2.0 |
|  | No. 12 | ○ | 154.9 | 195.2 | 8.5 |
|  | No. 13 | ○ | 117.0 | 146.4 | 5.9 |
| BLUE-BASED SAMPLES | No. 1 | ◎ | 403.9 | 367.2 | 65.6 |
|  | No. 2 | ◎ | 228.8 | 135.0 | 58.7 |
| COMMERCIALLY AVAILABLE SAMPLES | RED MICA 1 | X | 39.9 | 21.1 | 0.8 |
|  | RED MICA 2 | X | 23.6 | 6.7 | 1.2 |
| CURRENTLY AVAILABLE SAMPLES | RED MICA | X | 15.8 | 6.0 | 0.2 |
|  | RED METALLIC | X | 22.3 | 13.2 | 1.5 |
|  | ORANGE METALLIC | X | 8.0 | 11.6 | 0.7 |
|  | PURPLE MICA | X | 6.2 | 0.3 | 0.6 |
|  | ORANGE MICA | X | 11.1 | 3.6 | 0.1 |
|  | BLUE MICA | X | 5.2 | 0.6 | 0.6 |
|  | BLUE METALLIC | X | 10.7 | 4.8 | 0.6 |
|  | YELLOW METALLIC | X | 4.5 | 2.8 | 0.1 |
|  | GREEN METALLIC | X | 3.8 | 6.2 | 0.3 |
|  | GREEN MICA | X | 5.3 | 0.2 | 0.5 |

TABLE 1-continued

| | | | | |
|---|---|---|---|---|
| OPTIMUM RANGE | SUITABLE RANGE | >60 | >30 | >2 |
| | MOST SUITABLE RANGE | >80 | >80 | >8 |

TABLE 2

| | | 1BC | | | | |
|---|---|---|---|---|---|---|
| | | TARGET COLOR | | | | |
| | | HIGHLIGHT REFLECTANCE (%) $R_{1BC}^{H(P)}$ | FACE REFLECTANCE (%) $R_{1BC}^{F(P)}$ | SHADE REFLECTANCE R (%) $R_{1BC}^{S(P)}$ | HIGHLIGHT - SHADE | OUTSIDE HUE RANGE ① $R_{1BC}^{H(O-MAX)}$ |
| RED-BASED SAMPLES | No. 1 | 209.5 | 21.9 | 6.9 | 202.6 | 26.3 |
| | No. 2 | 176.9 | 22.9 | 7.8 | 169.1 | 23.8 |
| | No. 3 | 159.2 | 25.7 | 8.5 | 150.7 | 20.9 |
| | No. 4 | 171.6 | 25.8 | 8.6 | 163.0 | 34.8 |
| | No. 5 | 181.2 | 23.3 | 7.6 | 173.6 | 24.4 |
| | Vo. 6 | 164.8 | 25.9 | 8.5 | 156.3 | 23.4 |
| | No. 7 | 175.7 | 26.2 | 8.3 | 167.4 | 33.9 |
| | No. 8 | 176.0 | 23.1 | 7.7 | 168.3 | 19.2 |
| | No. 9 | 174.8 | 24.5 | 8.0 | 166.8 | 26.0 |
| | No. 10 | 192.0 | 25.1 | 7.8 | 184.2 | 39.9 |
| | No. 11 | 97.5 | 22.0 | 7.7 | 89.8 | 19.8 |
| BLUE-BASED SAMPLES | No. 1 | 284.6 | 10.1 | 3.8 | 280.8 | 285.0 |
| | No. 2 | 99.5 | 2.6 | 0.7 | 98.8 | 104.5 |
| OPTIMUM RANGE | | | <30 | | >90 | |

| | | ② TRANSMITTANCE $T_{2BC}^{(O-MAX)}$ OF 2BC | ①* ②/ 100)² | 2BC TRANSMITTANCE (%) | | |
|---|---|---|---|---|---|---|
| | | | | $T_{2BC}^{(P)}$ | $T_{2BC}^{(OA)}$ | $T_{2BC}^{(TA)}$ |
| RED-BASED SAMPLES | No. 1 | 40.9 | 4.4 | 91.8 | 28.3 | 55.58 |
| | No. 2 | 40.9 | 4.0 | 91.8 | 28.3 | 55.58 |
| | No. 3 | 40.9 | 3.5 | 91.8 | 28.3 | 55.58 |
| | No. 4 | 40.9 | 5.8 | 91.8 | 28.3 | 55.58 |
| | No. 5 | 40.9 | 4.1 | 91.8 | 28.3 | 55.58 |
| | Vo. 6 | 40.9 | 3.9 | 91.8 | 28.3 | 55.58 |
| | No. 7 | 40.9 | 5.7 | 91.8 | 28.3 | 55.58 |
| | No. 8 | 40.9 | 3.2 | 91.8 | 28.3 | 55.58 |
| | No. 9 | 40.9 | 4.4 | 91.8 | 28.3 | 55.58 |
| | No. 10 | 40.9 | 6.7 | 91.8 | 28.3 | 55.58 |
| | No. 11 | 40.9 | 3.3 | 92.5 | 29.1 | 54 |
| BLUE-BASED SAMPLES | No. 1 | 0.3 | 0.0 | 57.5 | 5.9 | 19.5 |
| | No. 2 | 0.4 | 0.0 | 77.0 | 10.2 | 27.5 |
| OPTIMUM RANGE | | | <7 | >55% | 0~50% | |

The relationship between the highlight reflectance $R^{H(P)}$ of the target color and the visually-evaluated chroma as shown in Table 1 shows that, for example, a currently available orange metallic sample, a currently available yellow metallic sample, and a commercially available sample, Red Mica 1, have relatively high highlight reflectance $R^{H(P)}$ while having low visually-evaluated chroma. This shows that high chroma cannot be achieved only with high highlight reflectance $R^{H(P)}$. By contrast, the red-based sample No. 11 and the blue-based sample No. 2 have, for example, substantially the same highlight reflectance $R^{H(P)}$ as the yellow metallic sample or lower highlight reflectance $R^{H(P)}$ than the yellow metallic sample while having high visually-evaluated chroma. While a currently available green metallic sample has high visually-evaluated chroma, it does not provide an appearance of denseness. None of the commercially available samples and the currently available samples provides an intended appearance of denseness.

In the case where Condition A ($=R^{H(P)}R^{H(OA)}$) is high, the evaluated chroma tends to be generally high, and an appearance of great denseness is achieved. The results of Table 1 show that Condition A is preferably greater than 60, and more preferably greater than 80.

Next, in terms of the shade reflectance $R^{S(P)}$, the tendency shows that a greater difference between the highlight reflectance $R^{H(P)}$ and the shade reflectance $R^{S(P)}$ results in an appearance of greater depth. However, for example, a commercially available sample, i.e., Red Mica 2, a currently available red metallic sample, and the currently available orange metallic sample provide a visually-evaluated appearance of greater depth while having low visually-evaluated chroma. A greater value for Condition B (($R^{H(P)}/R^{H(OA)}$)× ($R^{H(P)}-R^{S(P)}$)×1/100) results in higher visually-evaluated chroma and a visually-evaluated appearance of greater depth. The results of Table 1 show that Condition B is preferably greater than 30, and more preferably greater than 80.

Next, the 13 red-based samples have substantially the same face reflectance $R^{F(P)}$ as Red Mica 1 of the commercially-available samples and an orange mica one of the currently available samples while providing an appearance of greater depth and an appearance of greater denseness than Red Mica 1 of the commercially-available samples and the orange mica one of the currently available samples. The reason for this is that the difference between the highlight reflectance $R^{H(P)}$ and the face reflectance $R^{F(P)}$ is great. That is, a greater value for Condition C $((R^{H(P)}/R^{H(OA)}) \times (R^{H(P)} - R^{S(P)}) \times (1/R^{F(P)}) \times (1/100))$ in which the face reflectance $R^{F(P)}$ is reflected results in an appearance of greater depth and an appearance of greater denseness. The results of Table 1 show that Condition C is preferably greater than or equal to 2, and more preferably greater than 8.

Table 2 shows that the transmittance $T_{2BC}^{(P)}$ of light of the target color through the color clear layer (2BC) 5 of each of the 13 samples in total, i.e., the 11 red-based samples and the two blue-based samples, is higher than or equal to 55%. The average transmittance $T_{2BC}^{(OA)}$ of light in a wavelength range outside the hue range of the target color through the 2BCs of all the samples is equal to or less than 50%, and the average transmittance $T_{2BC}^{(OA)}$ of the light through the 2BCs of the 13 samples is equal to or less than 30%. The ratio of the transmittance $T_{2BC}^{(P)}$ of light of the target color to the average transmittance $T_{2BC}^{(TA)}$ of light in the visible region is greater than or equal to 1.5, and the ratio of the average transmittance $T_{2BC}^{(OA)}$ of the light in the wavelength range outside the hue range of the target color to the average transmittance $T_{2BC}^{(TA)}$ of the light in the visible region is equal to or less than 0.55. This shows that while a large amount of light of the target color is passed through the color clear layer 5, a large amount of light of colors except the target color is absorbed by the color clear layer 5, thereby helping increase the chroma.

Table 2 shows that the difference $(R_{1BC}^{H(P)} - R_{1BC}^{S(P)})$ between the highlight reflectance $R_{1BC}^{H(P)}$ and shade reflectance $R_{1BC}^{S(P)}$ of the target color off the metallic base layer (1BC) 4 of each sample is greater than or equal to 90%, and the face reflectance $R_{1BC}^{F(P)}$ of the target color off the metallic base layer (1BC) 4 is equal to or less than 30%. This shows that the intensity of light reflected off the metallic base layer 4 significantly varies depending on the observation angle, and the degree of change in reflected light intensity with a change in observation angle between the highlight and the face is high, thereby allowing the metallic base layer 4 to help provide an appearance of depth and an appearance of denseness. The situation where the degree of change in reflected light intensity is high means that the reflected light intensity sharply changes. The difference $(R_{1BC}^{H(P)} - R_{1BC}^{S(P)})$ between the highlight reflectance and shade reflectance of the metallic base layer (1BC) 4 of each sample is preferably greater than or equal to 150%, and more preferably greater than or equal to 170%. The face reflectance $R_{1BC}^{F(P)}$ of the metallic base layer 4 is preferably equal to or less than 25%.

Table 2 shows that the left-hand value of the formula (5) showing the relationship between a maximum highlight reflectance $R_{1BC}^{H(O-MAX)}$ of the metallic base layer 4 in the wavelength range outside the hue range of the target color and the light transmittance $T_{2BC}^{(O-MAX)}$ of the color clear layer at the wavelength of light having the maximum highlight reflectance is less than 7.

$$R_{1BC}^{H(O-MAX)} \times (T_{2BC}^{(O-MAX)}/100)^2 < 7 \quad (5)$$

This shows that a small amount of light of colors except the target color is reflected off the metallic base layer 4, or a large amount of light of colors except the target color is absorbed by the color clear layer 5. In short, the amount of light of colors except the target color exiting from the laminated coating film is small. This helps achieve high chroma.

DESCRIPTION OF REFERENCE CHARACTERS

1 Vehicle Body (Steel Sheet)
2 Laminated Coating Film
3 Electrodeposition Coating Film
4 Metallic Base Layer (1BC)
5 Color Clear Layer (2BC)
6 Top Clear Layer
7 Bright Material
8 Pigment
9 Intermediate Coating Film

The invention claimed is:
1. A laminated coating film comprising:
a metallic base layer; and
a color clear layer, the metallic base layer and the color clear layer allowing the laminated coating film to produce a red color as a target color, wherein
the metallic base layer contains a bright material and a pigment,
the color clear layer contains the pigment,
a reflectance measured with reference to a reflectance of a standard white plate at a light incidence angle of 45 degrees and a light reception angle of +30 degrees is defined as a highlight reflectance,
when a hue range is indicated by dividing a Munsell hue circle into one hundred sectors with a hue of the target color set at a median value of the Munsell hue circle, and increasing a hue number to +50 in a counterclockwise direction while decreasing the hue number to −50 in a clockwise direction, a range from −25 to +25 corresponds to a hue range of the target color,
the laminated coating film satisfies the following formula (1):

$$(R^{H(P)}/R^{H(OA)}) > 60,$$

where $R^{H(P)}$ represents a highlight reflectance of light of the target color, and $R^{H(OA)}$ represents an average highlight reflectance of light in a wavelength range outside the hue range,
a reflectance measured with reference to a reflectance of the standard white plate at the light incidence angle of 45 degrees and a light reception angle of −30 degrees is defined as a shade reflectance,
a reflectance measured with reference to a reflectance of the standard white plate at the light incidence angle of 45 degrees and a light reception angle of 0 degree is defined as a face reflectance,
a difference $(R_{1BC}^{H(P)} - R_{1BC}^{S(P)})$ between a highlight reflectance $R_{1BC}^{H(P)}$ of the metallic base layer and a shade reflectance $R_{1BC}^{S(P)}$ of the metallic base layer is greater than or equal to 90%, and a face reflectance $R_{1BC}^{F(P)}$ of the metallic base layer is equal to or lower than 30%, where $R_{1BC}^{H(P)}$, $R_{1BC}^{S(P)}$, and $R_{1BC}^{F(P)}$ represent reflectances of light of the target color,
the laminated coating film further satisfies the following formula (5):

$$R_{1BC}^{H(O-MAX)} \times (T_{2BC}^{(O-MAX)}/100)^2 < 7,$$

where $R_{1BC}^{H(O-MAX)}$ represents a maximum highlight reflectance of the metallic base layer in the wavelength range outside the hue range, and is higher than or equal to 19.2% and equal to or lower than 39.9%, and $T_{2BC}^{(O\text{-}MAX)}$ represents a light transmittance of the color clear layer at a wavelength of light having the maximum highlight reflectance, a transmittance $T_{2BC}^{(P)}$ of light of the target color through the color clear layer is higher than or equal to 91%, and an average transmittance $T_{2BC}^{(OA)}$ of light in the wavelength range outside the hue range is higher than or equal to 28% and equal to or lower than 50%.

2. The laminated coating film of claim 1, wherein a reflectance measured with reference to a reflectance of the standard white plate at the light incidence angle of 45 degrees and a light reception angle of −30 degrees is defined as a shade reflectance, and the laminated coating film further satisfies the following formula (2):

$$(R^{H(P)}/R^{H(OA)}) \times (R^{H(P)} - R^{S(P)}) \times 1/100 > 30,$$

where $R^{S(P)}$ represents a shade reflectance of light of the target color.

3. The laminated coating film of claim 2, wherein a reflectance measured with reference to a reflectance of the standard white plate at the light incidence angle of 45 degrees and a light reception angle of 0 degree is defined as a face reflectance, and the laminated coating film further satisfies the following formula (3):

$$(R^{H(P)}/R^{H(OA)}) \times (R^{H(P)} - R^{S(P)}) \times (1/R^{F(P)}) \times (1/100) \geq 2,$$

where $R^{F(P)}$ represents a phase reflectance of light of the target color.

4. The laminated coating film of claim 3, wherein the laminated coating film further satisfies the following formula (4):

$$(R^{H(P)}/R^{H(OA)}) \times (R^{H(P)} - R^{S(P)}) \times (1/R^{F(P)}) \times (1/100) > 8.$$

5. The laminated coating film of claim 1, wherein the reflectance difference $(R_{1BC}^{H(P)} - R_{1BC}^{S(P)})$ of the metallic base layer is greater than or equal to 150%.

6. The laminated coating film of claim 5, wherein the reflectance difference $(R_{1BC}^{H(P)} - R_{1BC}^{S(P)})$ of the metallic base layer is greater than or equal to 170%.

7. The laminated coating film of claim 1, wherein the face reflectance $R_{1BC}^{F(P)}$ of the metallic base layer is equal to or lower than 25%.

8. The laminated coating film of claim 1, further comprising:

a top clear layer on the color clear layer.

9. A coated article comprising:

the laminated coating film of claim 1.

* * * * *